United States Patent [19]

Ishise et al.

[11] Patent Number: 4,586,970
[45] Date of Patent: May 6, 1986

[54] METHOD OF FORMING AN INSULATED CONDUCTOR SPLICE UTILIZING HEAT SHRINKABLE TUBES

[75] Inventors: Kojiro Ishise; Keiichi Kojima, both of Osaka, Japan

[73] Assignee: Sumitomo Electric Industries, Ltd., Osaka, Japan

[21] Appl. No.: 739,353

[22] Filed: May 30, 1985

Related U.S. Application Data

[63] Continuation of Ser. No. 366,964, Apr. 9, 1982, abandoned, which is a continuation of Ser. No. 168,228, Jul. 10, 1980, abandoned.

[30] Foreign Application Priority Data

Jul. 10, 1979 [JP] Japan ................................ 54-87641
Jul. 10, 1979 [JP] Japan ................................ 54-87642

[51] Int. Cl.[4] ..................... B21F 15/06; H01R 4/00; H01R 43/033
[52] U.S. Cl. ........................................ 156/48; 156/49; 156/86; 156/158; 156/227; 156/245; 156/272.2; 156/285; 156/294; 156/307.7; 174/73 R; 174/84 R; 174/85; 174/94 R; 174/DIG. 8
[58] Field of Search .................. 156/48, 49, 86, 158, 156/227, 245, 272.2, 285, 294, 307.7; 174/73 R, 84 R, 85, 94 R, DIG. 8

[56] References Cited

U.S. PATENT DOCUMENTS

| | | | |
|---|---|---|---|
| 3,691,505 | 9/1972 | Graves | 174/84 R |
| 3,717,717 | 2/1973 | Cunningham et al. | 156/49 |
| 3,761,602 | 9/1973 | De Sio et al. | 174/94 R |
| 4,084,307 | 4/1978 | Schultz | 156/49 |
| 4,271,329 | 6/1981 | Perelmuter | 156/86 |
| 4,289,721 | 9/1981 | Ishise | 174/DIG. 8 |
| 4,477,376 | 10/1984 | Gold | 156/48 |
| 4,496,795 | 1/1985 | Konnik | 156/49 |
| 4,500,371 | 2/1985 | Degroot | 156/48 |

Primary Examiner—Jerome Massie
Attorney, Agent, or Firm—Sughrue, Mion, Zinn, Macpeak and Seas

[57] ABSTRACT

A method of forming a connection part for polyolefin insulated electrical wires or cables is disclosed which comprises a cross-linkable reinforcing insulation layer around said connection part, providing around said reinforcing insulation layer a heat shrinkable tube consisting of an integrated assembly of a semiconductive layer and a specific insulated portion consisting of at least two cylindrical heat shrinkable semiconductive members in combination with each other through an insulation material, and then heating said tube under pressure to effect crosslinking of said reinforcing insulation layer and cause said reinforcing layer to become integrated with said heat shrinkable tube. A heat shrinkable tube for use in this method is also described.

16 Claims, 2 Drawing Figures

METHOD OF FORMING AN INSULATED CONDUCTOR SPLICE UTILIZING HEAT SHRINKABLE TUBES

This is a continuation of application Ser. No. 366,964, filed Apr. 9, 1982, now abandoned, which is a continuation of application Ser. No. 168,228 filed July 10, 1980 now abandoned.

BACKGROUND OF THE INVENTION

1. Field of the Invention

This invention relates to a method of forming an insulated connection part of electrical wires and cables and heat shrinkable tube for use therein.

2. Description of the Prior Art

Recently, cross-linked polyethylene insulated electrical wires and cables have tended to be used at much higher voltages and accompanied with this tendency further more improved reliability of connection parts for cross-linked polyethylene insulated electrical wires and cables is required. For this purpose, it has been heretofore proposed to use so-called molded connection parts, which are obtained by applying a reinforcing insulation layer made of rubber, plastics, etc., around a connection part of an electrical wire or cable and heat molding this assembly under pressure to cause the reinforcing insulation layer to form an integrated unit with the insulation layer of the cable.

On the other hand, there also has been a recent tendency that the practical application of these wires and cables with molded connection parts covers a distance much longer than ever before encountered. Heretofore, conventional methods for forming molded connection parts for cross-linked polyethylene insulated electrical wires or cables have generally comprised applying a reinforcing layer around the insulated connection part by winding a tape made of polyethylene containing a cross-linking agent or cross-linked polyethylene or alternatively pouring such crosslinking agent containing polyethylene or cross-linked polyethylene into a metal mold provided around the connection part, winding around the thus-provided reinforced material a tape of a semiconductive material and then a tape of an insulating material to thereby form a specific insulated portion. Since these conventional methods require heat molding of the connection part as a whole simultaneously after providing the semiconductor and the specific insulated portion, they may have many defects. For example, the tip of the outer semiconductive layer in the specific insulated portion can be fluidized or deformed to form a sharp protrusion, and the interface between the reinforcing insulation layer and the connection part can undulate and loses smoothness such that the electrical wire or cable cannot provide satisfactory electrical properties.

In order to eliminate the above-described disadvantages a method has heretofore been proposed which comprises grinding the surface of the reinforcing insulation layer after heat molding to smooth it, winding a tape of semiconductive material around a reinforcing layer on one conductor in a region extending from one end of the reinforcing layer to the center thereof and then winding a tape of an insulated material around the end of the wound tape of the semiconductive layer to thereby form a specific insulated portion, and winding a tape of semiconductive material around the other conductor. This method, however, is disadvantageous in that molding takes a rather long time.

SUMMARY OF THE INVENTION

The object of this invention is, therefore, to overcome the above-described defects and to provide good molded connection parts of electrical wires and cables.

It is another object of the present invention to provide an insulated connection part comprised of a specific insulated portion having a specific structure consisting of two shielding layers (outer semiconductive members) combined with each other through an insulation material.

As a result of extensive research it has been found that a connection part of cross-linked polyolefin insulated electrical wires or cables having excellent electrical properties can be obtained in a reduced working period by providing on a crosslinkable reinforcing layer a heat shrinkable tube having a construction of a specific insulated portion (i.e., an insulated portion having a specific structure consisting of at least two cylindrical heat shrinkable semiconductive layers combined with each other through an insulation material), heating the tube to shrink and snugly enclose the reinforcing layer and then heat molding the reinforcing insulation layer to effect cross-linking.

This invention is based on the above finding and provides a method for forming a connection part for polyolefin insulated electrical wires or cables which comprises a cross-linkable reinforcing insulation layer around said connection part, providing around said reinforcing insulation layer a heat shrinkable tube comprising an integrated assembly of a semiconductive layer and a specific insulated portion consisting of at least two cylindrical heat shrinkable semiconductive members in combination with each other through an insulation material, and then heating said tube under pressure to effect crosslinking of said reinforcing insulation layer and cause said reinforcing layer to become integrated with said heat shrinkable tube.

In another aspect, this invention provides a heat shrinkable tube comprising an integrated assembly of a semiconductive layer and a specific insulated portion consisting of at least two cylindrical heat shrinkable semiconductive members combined with each other at one end thereof through an insulation material.

BRIEF DESCRIPTION OF THE ACCOMPANYING DRAWINGS

DETAILED DESCRIPTION OF THE INVENTION

Figure 1:
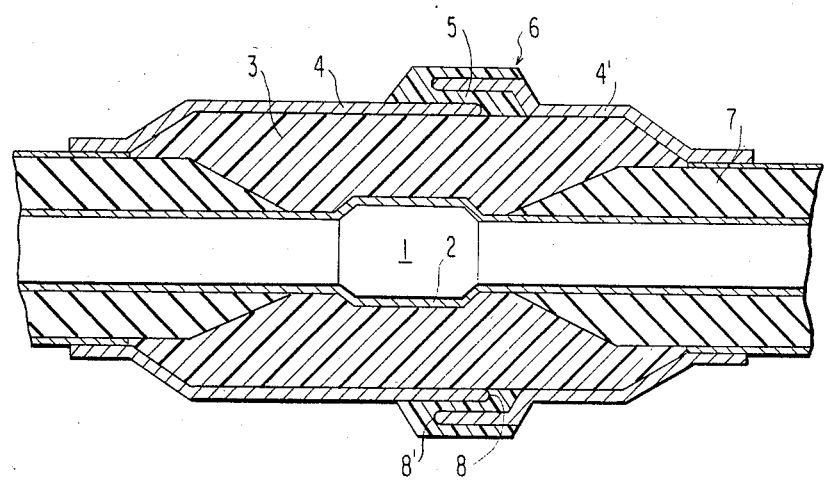
FIG. 1 is a schematic longitudinal cross-sectional view of an insulated connection part obtainable according to the method of this invention.
Figure 2:
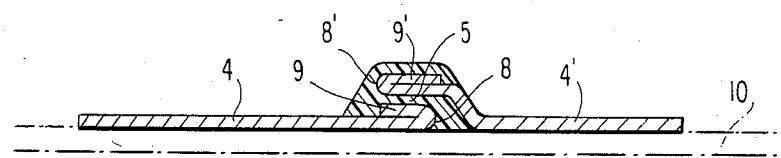
FIG. 2 is a schematic longitudinal sectional view of the upper half of a heat shrinkable tube according to this invention.

With reference to the FIGS. 1 and 2 this invention will be described in greater detail hereinbelow.

On a connection part 1 of a conductor is applied an inner semiconductive layer 2 and then a reinforcing insulation layer 3 is provided on the inner semiconductive layer 2. As a material for producing the reinforcing insulation layer 3, polyolefins that are employed conventionally in cable insulation can be used such as polyethylene, uncross-linked polyethylene containing a cross-linking agent such as dicumyl peroxide, ethylene/propylene copolymers, etc. These materials can be applied in the form of a tape by winding it around the inner semiconductor, or alternatively they can be applied by pouring into a metal mold (not shown) placed around the inner semiconductive layer 2. It is preferred to apply the reinforcing material by pouring into a metal mold, since the surface of the reinforcing insulation layer is thus rendered smooth, and the interface between the outer semiconductive members 4 and 4' and a specific insulated portion 5 becomes smoother.

On the thus-formed reinforcing insulation layer 3 is placed a heat shrinkable tube 6 comprising the outer semiconductive members 4 and 4' and the specific insulated portion 5 and the tube 6 is heat shrunk using a burner, torch lamp, or similar conventional heating means. Thereafter, the whole assembly of connection part A is heated under pressure to cause the reinforcing insulation layer 3, inner semiconductive layer 2, cable insulator 7 and heat shrinkable tube 6 to become integrated with each other, thereby forming an insulated connection part for cross-linked polyolefin insulated electrical wires or cables.

With respect to the heat shrinkable tube 6 used in this invention and tips 8, 8' of the outer semiconductive layer member in the specific insulated portion 5 are formed in a round shape in order to avoid concentration of electric the field. Preferably, the tips 8 and 8' may be folded as shown in FIG. 2. Examples of material A for the specific insulated portion 5 include thermoplastic resins which can adhere to the reinforcing insulation layer 3 such as polyethylene, ethylene-vinyl acetate copolymers, ethylene-propylene copolymers, etc., since it is desirable to bond the specific insulated portion 5 to the reinforcing insulation layer 3 in order for the resulting electrical wires or cables to have satisfactory electric properties.

A mixture of the above-described thermoplastic resin and carbon black can be used as a material for producing the outer semiconductive members 4 and 4'.

The heat shrinkable tube 6 can be produced as follows. First, a semiconductive heat shrinkable tube member 4 is formed by bombarding electron beam onto a tube made of the above-described semiconductive material, or by heating a the tube of semiconductive material or by heating a the tube of semiconductive material containing a cross-linking agent, to effect cross-linking, and then heating the cross-linked material at a temperature higher than the softening point thereof to endow heat-shrinkability to the material thereby obtaining a semiconductive heat shrinkable tube. Then, two heat shrinkable tube members 4 and 4' thus-produced are combined with each other through the specific insulated portion 5 comprising the above-described insulating material, so as to form an assembly of the outer semiconductive members 4 and 4' with the specific insulated portion 5. Preferably, the tips 8, 8' of the semiconductive members 4 and 4' in the specific insulated portion may overlap each other. The assembly is then placed around a metal pipe having a diameter larger than that of the reinforcing insulation layer 3 and heated to form an integrated unit which retains heat shrinkability.

More particularly, a heat shrinkable tube according to a preferred embodiment of this invention is produced as follows.

A tube having an inner diameter of 25 mm and a thickness of 2 mm is extrusion molded using a semiconductive polyethylene blended with carbon black and expanded so as to have an inner diameter of 70 mm after it is bombarded with electron beams at an intensity of 15 Mrad. A tube member 30 cm in length is cut out of this tube and one end thereof 9 is folded in a length of 5 cm as shown in FIG. 2. The thus-obtained tube member 4 is placed over the surface of a longitudinally split half pipe of aluminum pipe 10 and is heated using a torch lamp (not shown) to effect shrinking.

Then, a cross-linked polyethylene tape which has preliminarily been elongated longitudinally is wound around the folded end 9 of the tube and the surface of the aluminum pipe adjacent thereto to a thickness of about 3 mm.

Further, another semiconductive heat shrinkable tube member 4' having one end 9' thereof folded in the same manner as above is placed so that if covers a part of the portion on which cross-linked polyethylene is wound and the aluminum pipe. The thus-formed assembly on the aluminum pipe is then heated using a torch lamp to cause shrinkage. After the whole assembly is heated at 150° C. for 30 minutes to form an integrated unit, the aluminum pipe is removed to obtain a heat shrinkable tube of this invention.

It is preferred to further bombard electron beams onto the heat shrinkable tube thus-obtained in a narrow region thereof including the specific insulated portion 5, at an intensity of 20 Mrad, in order to render the shrink ratio of the region including the specific insulated portion 5 smaller than the shrink ratio of the remainder of the heat shrinkable tube.

Since, in the heat shrinkable tube 6 used in this invention the outer semiconductive member 4 and the specific insulated portion 5 together form an integrated unit preliminarily before use, there is no occurrence of no disadvantageous phenomenon that the tip of the outer semiconductive member in the specific insulated portion is fluidized or deformed to form a sharp protrusion leading to deteriorated electrical properties which would often be encountered in the conventional method in which the outer semiconductive member and the specific insulated portion are formed by winding un-cross-linked polyethylene tape around the reinforcing insulation layer and these members are heat molded simultaneously together with the reinforcing insulation material.

In addition to the above, the insulated electrical wires and cables produced by the method of this invention have another advantage. That is, in the heat shrinkable tube according to this invention, the shrink ratio of the specific insulated portion and the neighboring region is made smaller than the shrink ratio of the remainder of the heat shrinkable tubes and as a result this invention is free of problems of shape retention at the connection part of the wires or cables, and the problem wherein the tip of the outer semiconductive member in the specific insulated portion penetrates into the reinforcing insulation layer, which would be observed in the case wherein the outer semiconductive member and the specific insulated portion are formed by placing first a semiconductive heat shrinkable tube then an insulating heat shrinkable tube in this order on the reinforcing insulation layer, whereafter both tubes are heat molded simultaneously together with the reinforcing insulation layer.

Further, when the reinforcing insulation layer made of a cross-linking agent containing thermoplastic resin, e.g., polyethylene is heat treated to cross-link it and then first a semiconductive heat shrinkable tube followed by an insulating heat shrinkable tube are provided on the reinforcing insulation layer, followed by heating, penetration of the tip of the outer semiconductive member in the specific insulated portion into the reinforcing insulation layer can be prevented. However, this method takes a relatively long time to connect the cable since heat molding is conducted twice. Nevertheless, this embodiment of this invention can reduce time for working or connecting electrical wires or cables since the heat shrinkable tube can be heat molded together with the reinforcing insulation layer simultaneously after the former is placed on the latter.

In this invention, it is for the purpose of preventing the occurrence of voids that heating of the connection part of electrical wires or cables is performed under pressure.

As a means for pressurization a method can be used in which the connection part is sealed in a pressurizing container and a gas or oil or similar fluid is introduced under pressure, or a method can be used in which tension generated by winding the vulcanized rubber tape strongly around the connection part of the electrical wire or cable is used to create pressure. Of these methods the use of pressurizing container and an inert gas such as nitrogen gas for pressurization is preferred since the period of time required for heat molding can be shortened and at the same time it is possible to form a smooth finish on the surface of the connection part of the electrical wire or cable. A further advantage of this method is that there is no danger that the gas for pressurization will be incorporated in the reinforcing insulation layer since the reinforcing insulation layer is covered by the heat shrinkable tube, and that it is unnecessary to wipe out oils after heat molding. Thus, this invention fully utilizes the advantages derived by the use of heat shrinkable tubes.

EXAMPLES 1-3 AND COMPARISON EXAMPLES 1-5

In order to demonstrate the effects of this invention comparison was made between the method of this invention (Examples 1 to 3) and other methods (Comparison Examples 1 to 5) as described below.

Insulated connection parts were formed using a cross-linked polyethylene insulated cable having a conductor of cross section of 150 mm$^2$ and an insulation layer of 7 mm in thickness according to the methods shown in Table 1 below.

TABLE 1

| Cable Connection Method | Comparison Example 1 | Comparison Example 2 | Comparison Example 3 | Comparison Example 4 |
|---|---|---|---|---|
| Reinforcing Insulation Layer (thickness: 10 mm) | Poured into a Metal Mold | Poured into a Metal Mold | Tape Wound | Tape Wound |
| Outer Semiconductive Member | Tape Wound | Tape Wound | Semiconductive Heat Shrinkable Tube | Semiconductive Heat Shrinkable Tube |
| Specific Insulated Portion (thickness: 3 mm length: 30 mm) Heat Molding | Tape Wound | Tape Wound | Insulating Heat Shrinkable Tube | Insulating Heat Shrinkable Tube |
| Reinforcing Insulation Member | Shaped Simultaneously, Vulcanized Tape Wound *1 210° C. for 4 Hours | Vulcanized Tape Wound 210° C. for 4 Hours | Shaped Simultaneously, at 210° C. for 2 Hours under Nitrogen Gas Pressure *2 | Under Nitrogen Gas Pressure 210° C. for 2 Hours |
| Outer Semiconductive Layer Provided with Specific Insulated Portion | (see above) | Vulcanized Tape Wound 210° C. for 2 Hours | (see above) | Under Nitrogen Gas Pressure 210° C. for 2 Hours |

| Cable Connection Method | Comparison Example 5 | Example 1 | Example 2 | Example 3 |
|---|---|---|---|---|
| Reinforcing Insulation Layer (thickness: 10 mm) | Poured into a Metal Mold | Tape Wound | Poured into a Metal Mold | Poured into a Metal Mold |
| Outer Semiconductive Member | Semiconductive Heat Shrinkable Tube | Heat Shrinkable Tube Consisting of an Integrated Unit of Outer Semiconductive Member and Specific Insulated Portion | Heat Shrinkable Tube Consisting of an Integrated Unit of Outer Semiconductive Member and Specific Insulated Portion | Heat Shrinkable Tube Consisting of an Integrated Unit of Outer Semiconductive Member and Specific Insulated Portion |
| Specific Insulated Portion (thickness: 3 mm, length: 30 mm) Heat Molding | Insulating Heat Shrinkable Tube | (see above) | (see above) | (see above) |
| Reinforcing Insulation Member | Shaped Simultaneously at 210° C. for 2 Hours under Nitrogen Gas Pressure | Shaped Simultaneously at 210° C. for 2 Hours under Nitrogen Gas Pressure | Shaped Simultaneously, Vulcanized Tape Wound at 210° C. for 4 Hours | Shaped Simultaneously at 210° C. for 2 Hours under Nitrogen Gas Pressure |
| Outer Semiconductive Member Provided with Specific Insulated | (see above) | (see above) | (see above) | (see above) |

TABLE 1-continued

Portion

Note:
*1 Vulcanized tape wound: Vulcanized SBR rubber tape was elongated 100% and wound to a thickness of 10 mm to effect pressurization.
*2 Nitrogen gas pressure: Pressurization was performed at a pressure of 5 kg/cm$^2$ using a pressurizing container.

The appearance of the surface, condition of the tip of the outer semiconductive layer in the specific insulated portion, and AC initial breakdown value were compared and the results obtained are shown in Table 2 below.

TABLE 2

| Results | Comparison Example 1 | Comparison Example 2 | Comparison Example 3 | Comparison Example 4 |
|---|---|---|---|---|
| State of Interface between Reinforcing Insulation Layer and Outer Semiconductive Member | Uneven | Uneven | Rather Uneven | Smooth |
| State of Tip of Outer Semiconductive Member in Specific Insulated Portion | Protrusion | No Protrusion | Protrusion Penetrating into Reinforcing Insulation Member | No Protrusion |
| AC Initial Break Down Value | 80 KV | 160 KV | 110 KV | 170 KV |

| Results | Comparison Example 5 | Example 1 | Example 2 | Example 3 |
|---|---|---|---|---|
| State of Interface between Reinforcing Insulation Layer and Outer Semiconductive Member | Smooth | Rather Uneven | Uneven | Smooth |
| State of Tip of Outer Semiconductive Member in Specific Insulated Portion | Protrusion Penetrating into the Reinforcing Insulation Layer | No Protrusion | No Protrusion | No Protrusion |
| AC Initial Break Down Value | 120 KV | 190 KV | 180 KV | 230 KV |

From the results shown in Table 2 above, it can be seen that the method of forming insulated connection parts according to this invention as in Examples 1 to 3 is superior to the methods set forth in Comparison Examples 2 and 4 in that this invention enables one to form the parts in a much shortened period of time and in that this invention can prevent the occurrence of protrusion formed by fluidization or deformation of the tip of the outer semiconductive member in the specific insulated portion, which was observed in Comparison Example 1, or penetration of the tip of the outer semiconductive member in the specific insulated portion into the reinforcing insulation layer which was encountered in Comparison Examples 3 and 5. Thus, the method of this invention can provide a cable connection having improved electrical properties.

While the invention has been described in detail and with reference to specific embodiments thereof, it will be apparent to one skilled in the art that various changes and modifications can be made therein without departing from the spirit and scope thereof.

What is claimed is:

1. A method for forming a connection between cables or wires wherein said cables or wires are comprised of a conductor surrounded by a first semiconductor layer, surrounded by an insulator layer, surrounded by a second outer semiconductor layer, said method comprising the steps of:
   positioning the ends of two cables in electrical contact with an electrical conductor;
   applying a cross-linkable reinforcing insulation layer around said electrical conductor and around said insulator layer of each of said cables or wires;
   providing a heat shrinkable tube around said reinforcing insulating layer and around the outer semiconductor layer of each of said cables or wires, said tube comprising an integrated assembly of a semiconductive member and a specific insulated portion containing insulation material, said tube comprising two cylindrical heat shrinkable semiconductive members combined with each other but electrically separated from each other by said insulation material of the specific insulated portion; and
   heating said tube under pressure in order to cross-link said reinforcing insulation layer and cause said reinforcing insulation layer to become integrated with said heat shrinkable tube and electrically bond said semiconductive members of said tube to said outer semiconductor layer of each of said cables or wires.

2. The method as defined in claim 1, wherein said tube comprising an integrated assembly of a semiconductive member and a specific insulated portion comprises two cylindrical heat shrinkable semiconductive members arranged end-to-end, and a specific insulated portion consisting of said two cylindrical heat shrinkable semiconductive members surrounded and joined at the adjacent ends thereof by said insulation material.

3. The method of claim 1, wherein said pressurization is conducted using a pressurizing container and introducing an inert gas into said pressurizing container.

4. The method of claim 1, wherein said reinforcing insulation layer is formed by pouring rubber or a plastic material into a metal mold.

5. The method of claim 1, wherein said two heat shrinkable semiconductive members are combined such that they overlap each other partly.

6. The method of claim 1, wherein one end portion of each of said at least two semiconductive member is folded.

7. The method of claim 2, wherein said two heat shrinkable semiconductive members are combined such that they partially overlap each other at the adjacent ends thereof.

8. The method of claim 2, wherein a portion of each adjacent end of said two semiconductive layers is folded back upon itself.

9. Method as defined in claim 1, wherein the reinforcing insulation layer is applied by winding a tape around said electrical conductor and around said insulator layer of each of said cables or wires, and said heating under pressure is effected to simultaneously heat mold reinforcing insulation layer and said heat shrinkable tube.

10. Method as defined in claim 9, wherein the pressure is effected by gas pressure.

11. Method as defined in claim 1, wherein the reinforcing insulation layer is applied by pouring a reinforcing insulation material into a metal mold around said electrical conductor and around said insulator layer of each of said cables or wires, and said heating under pressure is effected to simultaneously heat mold said reinforcing insulation layer and said heat shrinkable tube.

12. Method as defined in claim 11, wherein the pressure is effected by gas pressure.

13. Method as defined in claim 11, wherein the pressure is applied by winding a vulcanized tape around the heat shrinkable tube.

14. Method as defined in claim 1, wherein electron beams are bombarded onto the specific insulated portion so that the shrink ratio of the specific insulated portion is smaller than the shrink ratio of the remainder of the heat shrinkable tube.

15. Method as defined in claim 1, wherein the pressure is effected by a fluid or gas pressure of 5 kg/cm$^2$.

16. Method as defined in claim 1, wherein said electrical connector is provided with a semiconductive layer before the reinforcing insulation layer is applied.

* * * * *